Dec. 2, 1930.  J. J. McGUIRE  1,783,852
VEHICLE BRAKE
Filed Dec. 26, 1928   2 Sheets-Sheet 1

WITNESSES
Jos. L. Ramie
A. J. Sperry

INVENTOR
John Joseph McGuire
BY
ATTORNEY

Dec. 2, 1930. J. J. McGUIRE 1,783,852
VEHICLE BRAKE
Filed Dec. 26, 1928 2 Sheets-Sheet 2

WITNESSES

INVENTOR
John Joseph McGuire
BY
ATTORNEY

Patented Dec. 2, 1930

1,783,852

UNITED STATES PATENT OFFICE

JOHN JOSEPH McGUIRE, OF YONKERS, NEW YORK

VEHICLE BRAKE

Application filed December 26, 1928. Serial No. 328,528.

This invention relates to reverse brakes for vehicles.

It is among the objects of the present invention to provide a reverse brake for vehicles, adapted when in operative position to permit forward travel of the vehicle, but to provide a positive latch preventing reverse movement of the vehicle wheels.

The present invention is adapted particularly for use when a motor vehicle is brought to rest as it is ascending an incline.

By the use of the present invention constant application of the service brake to retain the vehicle against rearward motion, is not required, and thus upon application of the device the operator may be free to move about or leave the vehicle without necessitating the application of the emergency brake or the service brake.

A further object of the present invention is to provide a reverse brake for vehicles, in which a free forward motion is permitted while the brake is applied. Thus from a standing position on an incline, the vehicle may be started in forward motion without danger of the usual sliding back, which often accompanies the attempt at simultaneous engagement of the clutch and releasing the brake.

It will be readily appreciated that the inadvertent back-sliding above referred to often results in serious personal and property damage, and that by reference to the following specification it will be seen that the invention is adapted to wholly prevent such backsliding and the consequent damage resulting therefrom.

Other objects of the present invention include the combination and interrelation of parts, whereby the whole forms a simple, economic structure formed of few parts and easily operated, and which thus accommodates itself readily to the demands of economic manufacture. The device is internally positioned with respect to the brake chain and is thus protected from damage and is arranged so that its use with a vehicle does not interfere with the conventional wiring gear thereof.

With these and other objects of the present invention in view, reference may be had to the accompanying drawings, in which Figure 1 is a top plan view of a vehicle chassis embodying my present invention;

Figure 1:
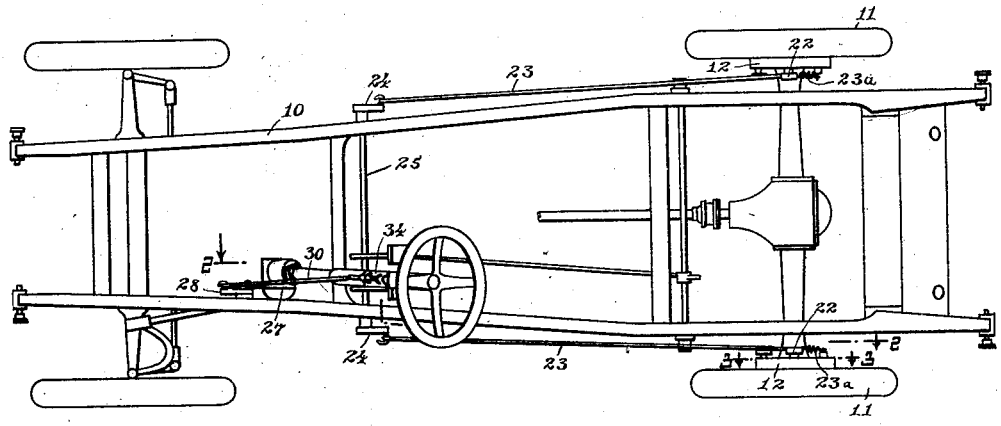
Figure 3:
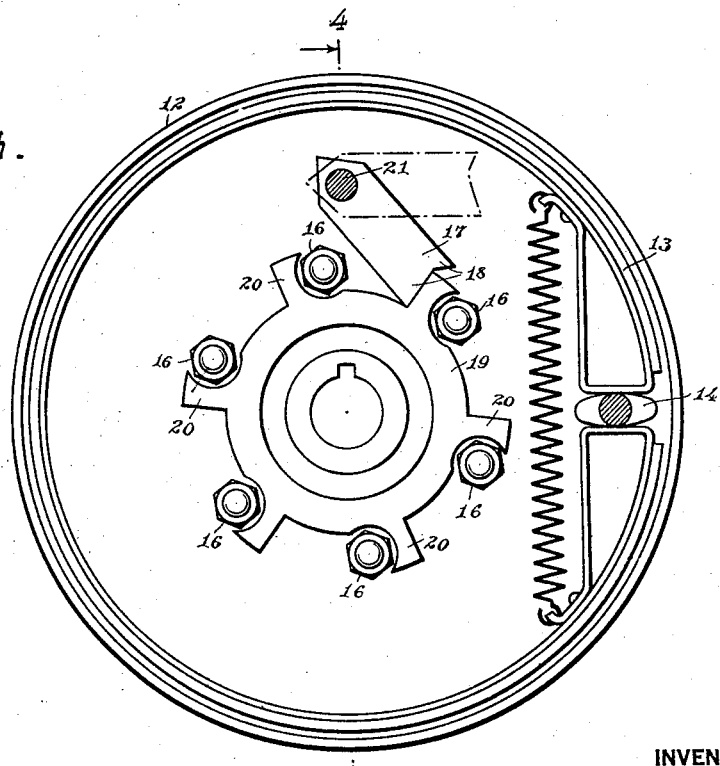
Fig. 3 is a sectional view taken on the lines 3—3 of Fig. 1.
Figure 2:
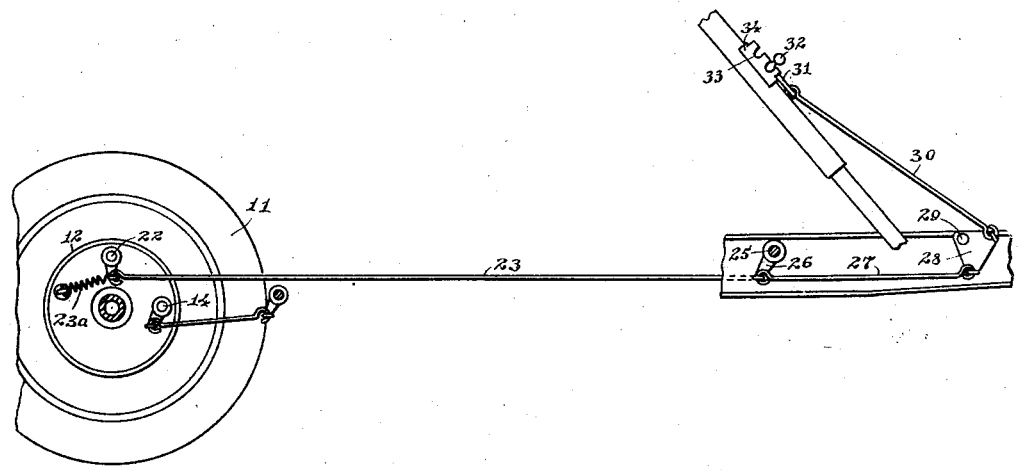
Fig. 2 is a sectional view taken on the lines 2—2 of Fig. 1.
Figure 4:
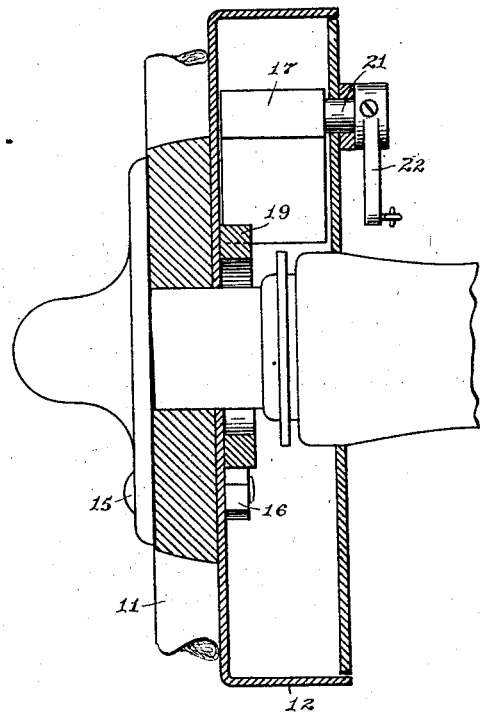
Fig. 4 is a sectional view taken on the lines 4—4 of Fig. 3.

Referring more particularly to the drawings, the invention has been illustrated as applied to a motor vehicle chassis 10, including the rear driving wheels 11 provided with brake drums 12. It will be readily understood that the specific type of chassis or the specific type of vehicle here illustrated, is shown merely by way of illustration and that the invention is applicable to many various types of vehicles. As illustrated in Figs. 3 and 4 of the drawings, the driving wheels 11 are usually provided with the conventional brake drum 12, which in the present instance, is illustrated as being provided with internally expanding brake bands 13, operable by the usual operating cam 14 and which is secured to the vehicle wheel through suitable bolts 15, their inner ends securing the drum 12 through the provision of nuts 16. This form of construction is usually such that a space between the bands 13 and the circle of securing nuts 16 is provided. In the present instance applicant mounts his reverse brake mechanism within this space.

The reverse brake mechanism includes a pawl 17, its engaging end being provided with angularly disposed faces 18 arranged for engagement with a ratcheting member or wheel 19, provided with projecting extremities 20, one face of which engages the nuts 16, while the opposite face is adapted for engagement with one of the faces 18 of the pawl 17, the arrangement being such that in the operation of the device, as will be hereinafter described, pressure applied through the pawl 17 is delivered directly to the wheel 11 and to each of the nuts 16 to avoid shearing of the nuts due to contact with the pawl 17. For operation of the pawl 17, it is mounted for rotation with an operating shaft 21, which passes through the drum 12, its outer end being provided with an operating lever 22, associated with a spring 23a for retaining the pawl 17 in engagement with the ratchet 19 when the reverse braking mechanism is released, as will be hereinafter described.

For releasing the pawl 17 for engagement with the ratchet 19, a shaft 23 is provided, one end of which is secured to the operating lever 22, while the forward end is associated with crank arms 24 of a shaft 25, intermediate the ends of which a crank 26 is provided, associated with a link 27, the forward end of which is secured to the bell crank 28, operable upon its pivot 29 by movement of a link 30, the opposite extremity of which is associated with an operating bolt 31 having a handle 32 engageable within notches 33 of its housing 34 in such manner as to retain the bolt 31 in adjusted position.

From the foregoing it will be readily seen that through the operation of the handle 32, the upward movement thereof acts through the link and crank arrangement to move forwardly the lever 22 against the tension of the spring 23a to raise the pawl 17 to the dotted-line position shown in Fig. 3 and out of operative engagement with the ratchet 19. It will be readily understood that the specific crank-and-link arrangement illustrated and described may be materially departed from, the essence of the invention residing in the pawl arrangement for preventing reverse rotation of the wheel 12.

When it is desired to prevent reverse rotation of the wheel 12, the handle 32 is permitted downward motion, it being urged toward such motion through the contract influence of the spring 23a. It will be readily seen that such motion results in rearward motion of the arm 22, whereby the pawl is permitted to assume a position as shown in full lines in Fig. 3. Thus upon forward rotation of the vehicle the pawl 17 is cammed upwardly against the tension of the spring 23 by the next adjacent nut 16, and thus passes over the next adjacent projection 20 of the ratchet 19, the movement being substantially that of the free movement of a pawl-and-ratchet mechanism. Upon reverse rotation of the wheel 12, however, one of the faces 18 of the pawl 17 will engage one of the projections 20 of the ratchet 19, as shown in Fig. 3, and further reverse rotation of the wheel 12 is prevented, such prevention, however, not interfering with forward movement of the wheel.

From the foregoing it will be readily seen that the invention provides a simple and efficient means for avoiding the necessity of application of emergency or reverse brakes when the wheel is stopped upon an incline, and thus the dangerous back-sliding previously referred to, is avoided and the free manipulation of the gear shift and clutch is permitted, without requiring simultaneous engagement by the clutch with releasing of the brakes.

It will be obviously seen that numerous changes and modifications of the present invention together with the full use of equivalents may be resorted to without departing from the spirit or scope thereof.

What is claimed is:

1. A device of the character described for association with a vehicle wheel, including a ratcheting member mounted upon the wheel, a pawl associated therewith, and means for controlling said pawl for operative and inoperative position with respect to said ratcheting member, said ratcheting member including a wheel and projecting extremities thereon, said projections being engageable with conventional securing means between said wheel and its associated brake drum.

2. A device of the character described for association with a vehicle wheel, including a ratchet member mounted upon the wheel, a pawl associated therewith, and means for controlling said pawl for operative and inoperative position with respect to said ratchet member, said ratchet member including a wheel having projecting extremities thereon forming the ratchet teeth thereof, one side of said projections being in the path of movement of one extremity of conventional securing means between said wheel and its associated brake drum to be held thereby.

3. In combination with a vehicle wheel including a brake drum and securing nuts therefor, a ratchet member mounted upon said wheel and including projections forming ratchet teeth, one side of said projections being adjacent to and secured against movement by engagement with the securing nuts of said drum, a pawl associated with said ratchet member, and means for controlling said pawl for operative and inoperative position with respect to said ratchet member.

4. In combination with a vehicle wheel including a brake drum and securing means between said drum and wheel, a rigid member including a plurality of projections, one face of said projections extending radially from the wheel, while the opposite face of said projections is cut away to receive thereagainst the securing means between said wheel and brake drum, and a pawl mounted upon said wheel for movement to operative or inoperative position with respect to said projections.

5. In combination with a vehicle wheel including a brake drum and securing means between said drum and wheel, a rigid member including a plurality of projections, one face of said projections extending radially from the wheel, while the opposite face of said projections is cut away to receive thereagainst the securing means between said wheel and brake drum, and a pawl mounted upon said wheel for movement to operative or inoperative position with respect to said projections, said pawl having an angularly cut free end adapted to receive thereagainst the radial side of said projections.

JOHN JOSEPH McGUIRE.